United States Patent
Nieuwborg et al.

(10) Patent No.: US 11,373,159 B2
(45) Date of Patent: Jun. 28, 2022

(54) PAYMENT TERMINAL

(71) Applicant: WORLDLINE, Bezons (FR)

(72) Inventors: Jan Nieuwborg, Wilrijk (BE); Jan Wellens, Schaarbeek (BE)

(73) Assignee: WORLDLINE, Bezons (FR)

( * ) Notice: Subject to any disclaimer, the term of this patent is extended or adjusted under 35 U.S.C. 154(b) by 34 days.

(21) Appl. No.: 16/760,200

(22) PCT Filed: Oct. 30, 2018

(86) PCT No.: PCT/EP2018/079766
§ 371 (c)(1),
(2) Date: Apr. 29, 2020

(87) PCT Pub. No.: WO2019/086490
PCT Pub. Date: May 9, 2019

(65) Prior Publication Data
US 2021/0182820 A1 Jun. 17, 2021

(30) Foreign Application Priority Data
Oct. 31, 2017 (FR) ...................................... 1760304

(51) Int. Cl.
*G06Q 20/20* (2012.01)
*G06F 1/16* (2006.01)
(Continued)

(52) U.S. Cl.
CPC ......... *G06Q 20/204* (2013.01); *G06F 1/1686* (2013.01); *G06F 1/1698* (2013.01);
(Continued)

(58) Field of Classification Search
CPC .................................................. G06Q 20/204
(Continued)

(56) References Cited

U.S. PATENT DOCUMENTS

| 6,021,944 A | * | 2/2000 | Arakaki | ................. | G06K 13/06 |
| | | | | | 235/375 |
| D726,182 S | * | 4/2015 | Durham | ....................... | D14/385 |

(Continued)

FOREIGN PATENT DOCUMENTS

| CN | 204740678 U | * 11/2015 |
| CN | 204740678 U | 11/2015 |

(Continued)

OTHER PUBLICATIONS

International Search Report from corresponding International Application No. PCT/EP2018/079766, dated Mar. 14, 2019, pp. 1-6, European Patent Office, Rijswijk, The Netherlands.

(Continued)

*Primary Examiner* — A. Hunter Wilder
(74) *Attorney, Agent, or Firm* — Hauptman Ham, LLP (57) ABSTRACT

A payment terminal with a housing having a planar upper face with an extension forming an angle $\theta_2$ between 30 and 50° with the planar face for receiving a contactless reading device, another end of the planar face comprising a magnetic stripe card reader and receiving, in a slot located above the magnetic stripe card reader and forming an angle $\theta_1$ between 30 and 50° with the planar face, a contact chip card reader, the terminal comprising a main circuit board comprising a controller and memory, the controller for controlling a display device displaying a keyboard and card reading, the board comprises a connector for a contact card reader oriented with the angle $\theta_1$ with the planar card surface and a flexible connector for connecting a wired antenna for reading of contactless payment means with the angle $\theta_2$ with the planar card surface.

30 Claims, 7 Drawing Sheets

(51) Int. Cl.

| | | |
|---|---|---|
| *G06K 7/10* | (2006.01) | |
| *G06K 7/14* | (2006.01) | |
| *G06Q 20/32* | (2012.01) | |
| *G06Q 20/34* | (2012.01) | |
| *G06F 3/0354* | (2013.01) | |
| *G06F 3/04842* | (2022.01) | |
| *G06F 3/04886* | (2022.01) | |
| *G06Q 30/02* | (2012.01) | |
| *G06Q 30/06* | (2012.01) | |

(52) U.S. Cl.
CPC ..... *G06K 7/10297* (2013.01); *G06K 7/10316* (2013.01); *G06K 7/10861* (2013.01); *G06K 7/1417* (2013.01); *G06Q 20/203* (2013.01); *G06Q 20/208* (2013.01); *G06Q 20/322* (2013.01); *G06Q 20/327* (2013.01); *G06Q 20/341* (2013.01); *G06Q 20/352* (2013.01); *G06F 3/03545* (2013.01); *G06F 3/04842* (2013.01); *G06F 3/04886* (2013.01); *G06K 2007/10504* (2013.01); *G06Q 30/0262* (2013.01); *G06Q 30/0631* (2013.01)

(58) Field of Classification Search
USPC .......................... D18/4.6, 4.4; D14/507, 371
See application file for complete search history.

(56) References Cited

U.S. PATENT DOCUMENTS

| | | | |
|---|---|---|---|
| 9,092,766 B1 | | 7/2015 | Bedier et al. |
| D814,559 S | * | 4/2018 | Oross .............................. D18/4.4 |
| D844,047 S | * | 3/2019 | Yeruva ........................... D18/4.6 |
| D844,607 S | * | 4/2019 | Fredette ........................ D14/385 |
| D851,169 S | * | 6/2019 | Yaginuma ..................... D18/4.6 |
| D859,516 S | * | 9/2019 | Wang ............................. D18/4.6 |
| D880,580 S | * | 4/2020 | Wang ............................. D18/4.4 |
| 2014/0347000 A1 | * | 11/2014 | Hamann ............... G06F 1/1626 320/103 |
| 2016/0117529 A1 | * | 4/2016 | Bedier .................. G06K 7/087 705/17 |
| 2019/0012491 A1 | * | 1/2019 | Su ........................... G06F 1/185 |

FOREIGN PATENT DOCUMENTS

| | | | | |
|---|---|---|---|---|
| ES | 2316255 A1 | * | 4/2009 | |
| ES | 2336186 A1 | | 4/2010 | |
| WO | WO-2006026341 A2 | * | 3/2006 | ............. G06F 1/169 |
| WO | WO-2014092615 A1 | * | 6/2014 | ........... G07F 7/1033 |

OTHER PUBLICATIONS

Written Opinion from corresponding International Application No. PCT/EP2018/079766, dated Mar. 14, 2019, pp. 1-6, European Patent Office, Rijswijk, The Netherlands.

* cited by examiner

PAYMENT TERMINAL

RELATED APPLICATIONS

The present application is a National Phase of International Application Number PCT/EP2018/079766, filed Oct. 30, 2018, and claims priority to French Application No. 1760304, filed Oct. 31, 2017.

FIELD OF THE INVENTION

The present invention concerns the field of devices for reading electronic cards and, in particular, a payment terminal.

BACKGROUND OF THE INVENTION

Electronic payment devices are, like the Internet, the most commonly used means for making transactions. Specifically, the transactions or the payment are made using a credit card and the majority of payments by credit card are made either in stores using a point-of-sale terminal where you insert or swipe your credit card and identify yourself with a Personal Identification Number, PIN, or over the Internet using a computer where you enter the details of your credit card and, in some cases, also a security code.

There are many different types of electronic payment device, but most of them have functionalities which are limited to the sole validation of transactions, despite the development of digital technology.

GENERAL DESCRIPTION OF THE INVENTION

The present invention has as its object to obviate certain drawback of the prior art by offering a means for ensuring transactions and taking advantage of advances in digital technology.

This goal is achieved by a payment terminal with a housing comprising a planar upper face with an extension at one end forming an angle $\theta_2$ between 30 and 50° with the planar face for receiving a contactless reading device for contactless reading and communicating with contactless payment means, the other end of the planar face comprising a magnetic stripe card reader and receiving, in a slot, located above the magnetic stripe card reader and forming an angle $\theta_1$ between 30 and 50° with the planar face, a contact chip card reader, said terminal comprising a main circuit board comprising at least a controller, at least a memory for storing data and/or programs, said controller comprising at least a processor for executing said programs when it receives instructions from the memory of the controller in order to control at least a display device displaying a virtual keyboard, means for communicating by Internet or by WiFi, and a functionality of contact or contactless card reading, the terminal being characterized in that said main circuit board comprises, at one end, a connector for a contact card reader oriented with an angle $\theta_1$ between 30 and 50° with the planar surface of the card and, at the other end, a flexible connector for connecting a wired antenna for a functionality of reading of contactless payment means with an angle $\theta_2$ between 30 and 50° with the planar surface of the card.

According to another feature, the memory of said main circuit board also comprises at least a program, the execution of which implements a "device tree" functionality, said functionality allowing the association of at least a set of devices with said terminal, said devices being controlled by the processor of said main circuit board.

According to another feature, said housing comprises a lower face opposite the planar upper face and comprising at least:
bearing areas in such a way that, when it is disposed on a counter or a desk, the extension of the planar upper face forms an angle of 45° with the surface of the counter or of the desk;
a cavity comprising at least:
  a set of sockets for plugging said terminal into a charging device and/or an electrical socket by means of a connector;
  an Ethernet socket for plugging in at least an Ethernet cable;
  a set of retention means for attaching said terminal to a support or attaching at least a charging device to the terminal.

According to another feature, the cavity of the lower face of said terminal comprises at least a SIM card slot for the 4G and/or 3G wireless connection of said payment terminal to the Internet, a micro-SD slot for recording data and at least a secure access module (SAM) slot for receiving at least a SAM card which manages the secure access to the functionality of said payment terminal.

According to another feature, the display device is an interactive touch-screen for displaying at least information such as icons or a button and comprising a virtual keyboard allowing a user to enter information or to make a selection of one or more icons to trigger a functionality or an application.

According to another feature, the interactive touch-screen comprises at least a light sensor for the automatic adaptation of the contrast of the display.

According to another feature, the interactive touch-screen comprises at least an accelerometer for the automatic orientation of the user interface in landscape mode or in portrait mode as a function of the orientation of the payment terminal.

According to another feature, the planar upper face comprises at least:
a camera for recording events when the terminal is used, said events being stored in the memory of said terminal;
a light guide located below the screen and near the edge of the extension of said planar face for detecting the contactless card.

According to another feature, the camera starts to record the events when a user interacts with the screen (14) of said payment terminal, the recording functionality of the camera being automatically turned on.

According to another feature, the camera stops recording when no user interacts with said screen of said payment terminal during a predetermined time, the recording functionality being automatically turned off.

According to another feature, said camera is adapted for reading tags or QR codes comprising information concerning a product via a scanning functionality included in said camera.

According to another feature, the payment terminal comprises a second camera located at the upper end of at least one lateral face of the housing of said payment terminal or at the lower face of said terminal.

According to another feature, the memory of the controller comprises at least a program, the execution of which enables to implement the functionality of triggering and recording of the camera.

According to another feature, the housing of the payment terminal also comprises at least one lateral face comprising a hole comprising at least a headphone socket for audio guiding during the plugging-in of a headphone and an accessibility control switch for increasing at least the contrast of the display or the font size used.

According to another feature, the end of said planar surface, comprising the slot of the chip card reader, comprises at least a speaker for guiding a user.

According to another feature, the housing of the payment terminal comprises, on a lateral face opposite said at least one lateral face comprising the headphone socket, a physical safety slot for receiving at least a lock which prevents the removal of a component of said payment terminal.

According to another feature, at least one lateral face of the housing of said payment terminal comprises at least a USB port allowing the connection of said terminal to at least a computer device or a smartphone, said computer device comprising at least wireless communicating means for configuring and communicating with the payment terminal.

According to another feature, the payment terminal is configured by said computer device or transfers at least information and/or data associated with a payment process to said computer device or vice versa by means of the connection.

According to another feature, the payment terminal is configured by the computer device to at least:
manage the programs implementing the functionalities of said terminal and already contained in the memory of the main circuit board;
add at least a set of new programs into said memory, the executions of which allow the implementation of at least a set of functionalities additional to the preceding functionalities of said payment terminal.

According to another feature, the lower face of the payment terminal comprises a reset button for resetting the configuration of the terminal, when said terminal is malfunctioning, a reset confirmation being requested on the screen of said terminal, when said reset button is enabled, in order to avoid the configuration of the terminal being automatically reset if said reset button is accidentally enabled.

According to another feature, the housing of the payment terminal comprises, on at least one of its lateral faces, a location for attaching a touch-sensitive pen, said pen being used to interact with the screen of said payment terminal.

According to another feature, the payment terminal comprises attaching means for cooperating with an attachment plate orienting the planar upper face of the terminal in such a way that the orientation of the chip card reader is such that said card forms an angle:
between 30 and 50° with respect to the horizontal, if said terminal is disposed on the attachment plate placed on the surface of a counter;
between 30 and 50° with respect to the vertical, if said terminal is disposed on the attachment plate mounted against a wall.

According to another feature, the payment terminal records information concerning at least one product that a customer usually purchases, said information being stored in a secure database with which said terminal communicates using its communicating means.

According to another feature, the payment terminal is adapted for displaying information stored in the secure database and associated with said product when a product purchased by a customer is nearly out of stock.

According to another feature, the payment terminal is adapted for connecting to the secure database or to the Internet, by a secure access, and searches for information concerning products and their availability on markets or in shopping centers in the neighborhood, said information being displayed on the screen of said terminal and suggested to the customer.

According to another feature, the payment terminal is adapted for displaying advertisements for a shopping center, to a cinema, a sports center or any other entertainment center when it is in standby mode.

According to another feature, the accessibility control switch of the payment terminal enables to remove the advertisements displayed on the screen of the payment terminal.

According to another feature, the contactless payment means comprise at least a chip card or other devices comprising a smartphone or other mobile devices.

Another object of the present invention consists in proposing an infrastructure for transactions.

This aim is achieved by a payment system comprising a connector housing (ITF) cooperating with the terminal as described in the present application, said connector housing being configured to be housed in the cavity of the lower face of said terminal and comprising at least an electrical power inlet socket, an Ethernet port, a USB port and at least a USB host to allow said payment terminal to communicate with at least a device configured on the "device tree".

Another object of the present invention consists in proposing a secure and nomadic payment device.

This aim is achieved by a portable payment terminal comprising a battery housing cooperating with said payment terminal (1) as described in the present application, said housing being configured to be housed in the cavity of the lower face of said payment terminal and comprising at least a battery, a power supply inlet socket and a micro USB device.

BRIEF DESCRIPTION OF THE DRAWINGS

Other features and advantages of the present invention will become more clearly apparent on reading the following description, given with reference to the appended drawings, wherein.

DESCRIPTION OF THE PREFERRED
EMBODIMENTS OF THE INVENTION

The present invention relates to a terminal (1, FIG. 1*a*) for the payment in a transaction.

In some embodiments, the payment terminal (1) includes a housing (10) comprising a planar upper face with an extension at one end forming an angle $\theta_2$ (see FIG. 1*b*) between 30 and 50° with the planar face for receiving a contactless reading device (121) for contactless reading and communicating with contactless payment means. Preferably, the angle $\theta_2$ is 45°. The other end of the planar face comprises a magnetic stripe card reader (11) and receives, in a slot (13), located above the magnetic stripe card reader (11) and also forming an angle $\theta_1$ between 30 and 50° with the planar face, a contact chip card reader, said terminal (1) comprising a main circuit board (1030) comprising at least a controller, at least a memory for storing data and/or programs. The controller comprises at least a processor for executing said programs when it receives instructions from the memory of the controller in order to control at least a display device (14) displaying a virtual keyboard, means for communicating by Internet or by WiFi, and a functionality of contact or contactless card reading. Preferably, the angle $\theta_1$ of the contact card reader with the planar face is 45° and is identical to that of the extension. The main circuit board (1030) of the terminal (1) comprises, at one end, a connector for the contact card oriented with an angle $\theta_1$ between 30 and 50°, preferably 45°, with the planar surface of the card and, at the other end, a flexible connector for connecting a wired antenna (120) for a functionality of reading of contactless payment means with an angle $\theta_2$ between 30 and 50°, preferably 45°, with the planar surface of the card.

In some embodiments, the display device (14, FIG. 1*a*) is an interactive touch-screen (14) for displaying at least information such as icons or a button and comprising a virtual keyboard allowing a user to enter information or make a selection of one or more icons to trigger a functionality or an application.

The expression "contactless reading device" (121, see for example FIGS. 4*a* and 4*b*) (payment means) denotes any reading device (payment means) which does not require direct contact with the payment means (reading device) in order to communicate at least information by means of RFID (Radio-Frequency IDentification) or NFC (Near Field Communication) technology for making secure payments.

It should be understood that the expression "contactless payment means" refers to a chip card (credit card, debit card or smart card) or to other devices comprising a smartphone and other mobile devices.

Figure 4A:
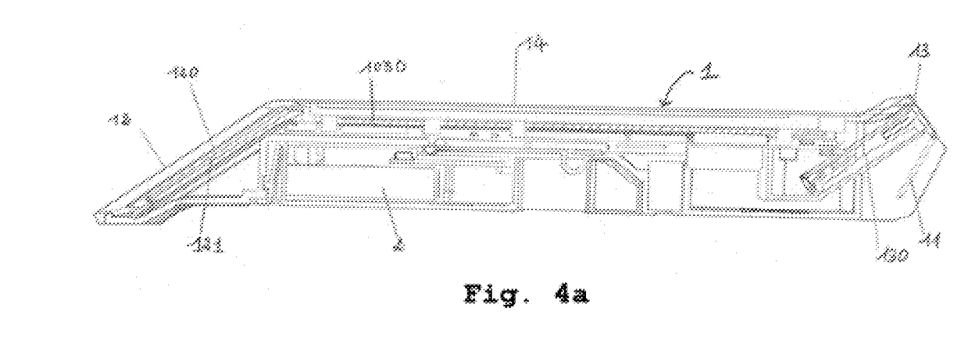
FIGS. 4a and 4b are respectively schematic representations of the cross-sections of a payment terminal comprising a battery housing according to an embodiment and a connector housing according to another embodiment.
Figure 4B:
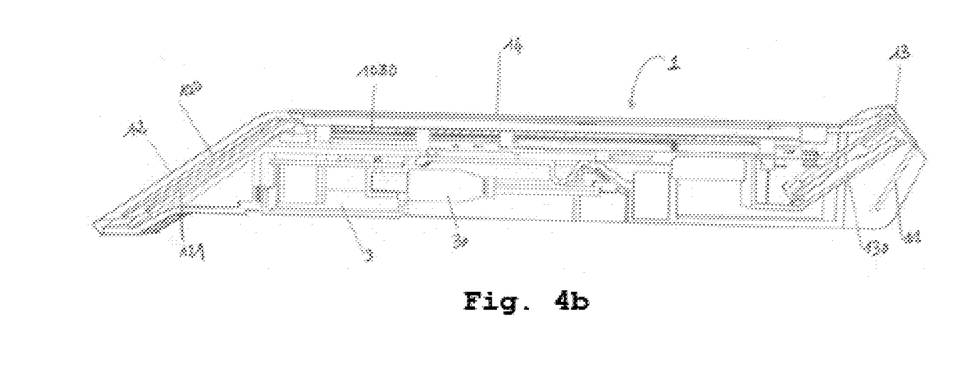

In some embodiments, the memory of said main circuit board (1030; FIGS. 4*a* and 4*b*) also comprises at least a program, the execution of which implements a "device tree" functionality, said functionality allowing the association of at least a set of devices to said terminal (1), said devices being controlled by the processor of said main circuit board (1030). The devices managed by the "device tree" can be, for example and without limitation, a computer, a mobile phone or a USB device. The "device tree" can be configured by means of a program in order to allow more devices or hardware items to interact with said payment terminal (1). In some embodiments, the main circuit board (1030) can also comprise at least a Bluetooth module, for example and without limitation, a BLE 4.2 module, for the connection of said terminal (1) to another terminal or to a device comprising Bluetooth technology. Said wireless communicating means can be used to exchange data for example.

In some embodiments, the terminal comprises an authentication/authorization program or software for securely configuring the "device tree" such that said "device tree" blocks access to all devices or hardware items not featuring on a stored list of devices or hardware items authorized to interact with said terminal. The terminal can comprise an alarm to emit a signal when an unauthorized device is not recognized by the "device tree".

In some embodiments, the terminal may comprise a program, the execution of which on its processor enables to implement a method for securing the payment terminal (1) when the latter has to interact with an external device (for example a computer or a tablet), said method comprising at least:

sending an authentication request to the external device and;
  if the external device does not have authorization or does not answer the authentication request, enabling of an alarm to emit a sonic signal and blocking of access to the terminal
  if not, checking of the authentication information sent by the external device on a stored list of devices authorized to connect to the terminal and;
    if the device is listed in the list, authorization of the access
    if not, enabling of an alarm to emit a sonic signal and blocking of access to the terminal.

Figure 3:
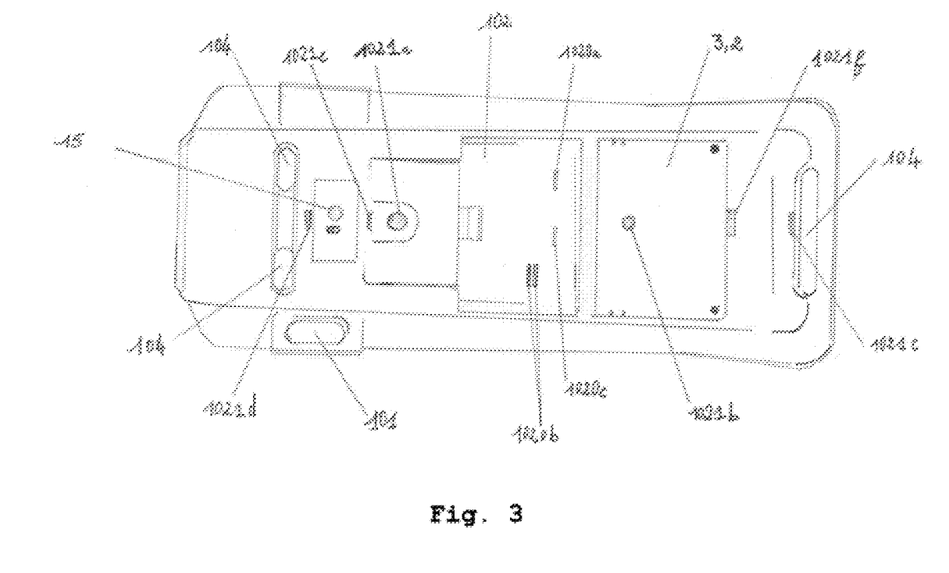
FIG. 3 is a schematic representation of the lower face or rear side of the payment device according to an embodiment.

In some embodiments, the housing (10) of the payment terminal (1) comprises a lower face opposite the planar upper face as shown in FIG. 3. Said lower face comprises at least:

bearing areas (104) in such a way that, when it is disposed on a counter or a desk, the extension of the planar upper face forms an angle $\theta_2$ between 30 and 50° with the surface of the counter or the desk, preferably 45°;
a cavity (102) comprising at least:
  a set of sockets for plugging said terminal (1) into a charging device and/or an electrical socket by means of a connector;
  an Ethernet socket for plugging in at least an Ethernet cable;
  a set of retention means (1021*a*, 1021*b*, 1021*c*, 1021*d*, 1021*e*, 1021*f*) for attaching (fixing) said terminal (1) to a support (4, see for example FIG. 7*a* wherein the chip card reader is oriented upward and FIG. 7*b* wherein said chip card reader is oriented downward) or attaching at least a charging device to the terminal.

In some embodiments, the cavity (102) of the lower face of said terminal comprises at least a SIM card slot (1020*c*) for the 4G and/or 3G wireless connection of said payment terminal to the Internet, a micro-SD slot (1020*a*) for recording data and at least a secure access module (SAM) slot (1020*b*) for receiving at least a SAM card which manages the secure access to the functionality of said payment terminal. In some embodiments, the SAM card is integrated into the main circuit board. (1030).

The SAM card can be either a SIM card and be plugged into the location for SAM cards, or a fixed integrated circuit in a housing directly soldered onto the main circuit board. The SAM card manages all the key management and cryptography in a secure manner. SAM cards can be used at least:

for generating application keys on the basis of master keys;

for storing and securing master keys;

for carrying out cryptographic functions with chip cards;

as a secure encryption device;

for carrying out a mutual authentication;

for generating session keys;

for carrying out the secure exchange of messages;

In some embodiments, the set of retention means comprises at least flexible attachment lips.

Figure 1A:
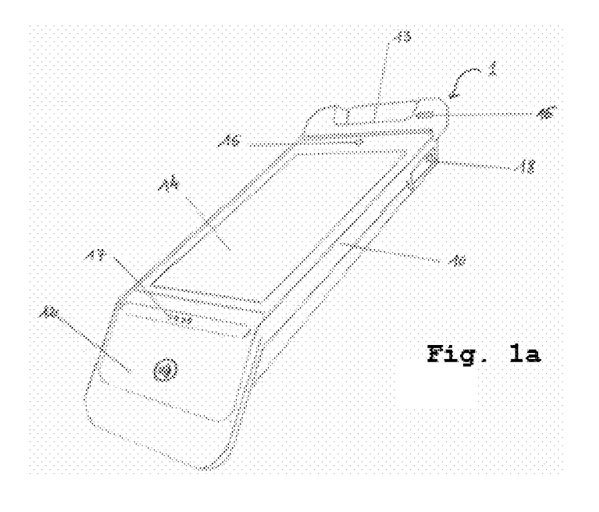
FIGS. 1a and 1b are respectively schematic representations of the perspective view of the front face of the payment device according to an embodiment and of a terminal cooperating with an attachment plate and with the chip card reader and the contactless card reader surface of said terminal respectively forming an angle $\theta_1$ and $\theta_2$ with respect to the planar upper face of said terminal according to an embodiment.
Figure 1B:
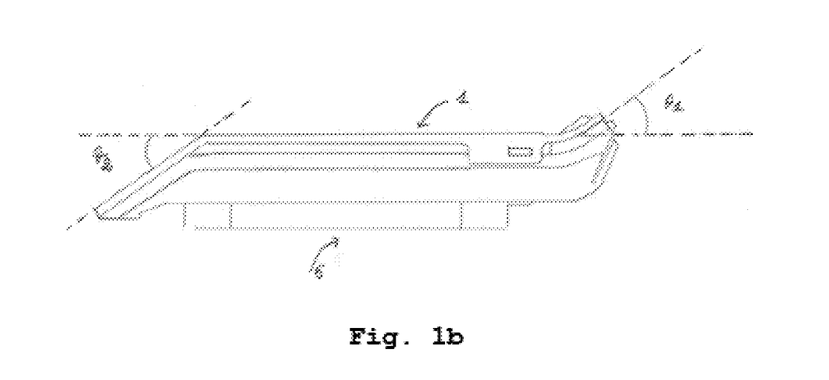

In some embodiments, the planar upper face of said payment terminal (1) comprises at least:

a camera (15, FIG. 1a) for recording events when the terminal (1) is used, said events being stored in the memory of said terminal (1);

a light guide (17) located below the screen and near the edge of the extension of said planar face for detecting contactless cards.

The information displayed by the interactive touch-screen can be, for example and without limitation, the amount of a given transaction made by the user, a set of instructions for performing said transactions such as for example "Enter your password" etc.

In some embodiments, the display device (14) or the interactive touch-screen comprises at least a light sensor for the automatic adaptation of the contrast of the display.

In some embodiments, the display device (14) or the interactive touch-screen comprises at least an accelerometer for the automatic orientation of the user interface in landscape mode or in portrait mode as a function of the orientation of the payment terminal (1).

The camera (15) is, preferably, located in the upper part of said interactive touch-screen. Advantageously, the recorded events can be used to secure the transactions or to prevent fraudulent actions. In some embodiments, the events recorded by the camera (15) and associated with a given payment card can be stored in a memory or a server, using the communicating means, with at least an identification number making it possible to link said card to said events. When a fraud attempt takes place with said payment card, i.e. for example and without limitation, an incorrect password entered more than a predetermined number of times or an amount greater than a daily threshold value, the latter event can be compared to preceding events, associated with said card, in which the transactions have been made successfully, in order to check, for example, that the user or users are the same and that no other person is using said payment card.

In some embodiments, the recording of events by the camera (15) is triggered when a user interacts with the screen (14) of said payment terminal (1). Specifically, when a user interacts with said payment terminal (1), the recording functionality of the camera (15) is automatically turned on and said camera (15) starts the recording of the events. When no used interacts with said screen (14) of said payment terminal (1) for a predetermined time, said recording functionality is automatically turned off.

In some embodiments, the functionality of triggering and recording the camera (15) is implemented by the execution, on said processor, of at least a program included in the memory of the controller.

In some embodiments, the camera (15) is adapted for reading tags or QR codes comprising information concerning a product via a scanning functionality included in said camera (15).

Figure 2:
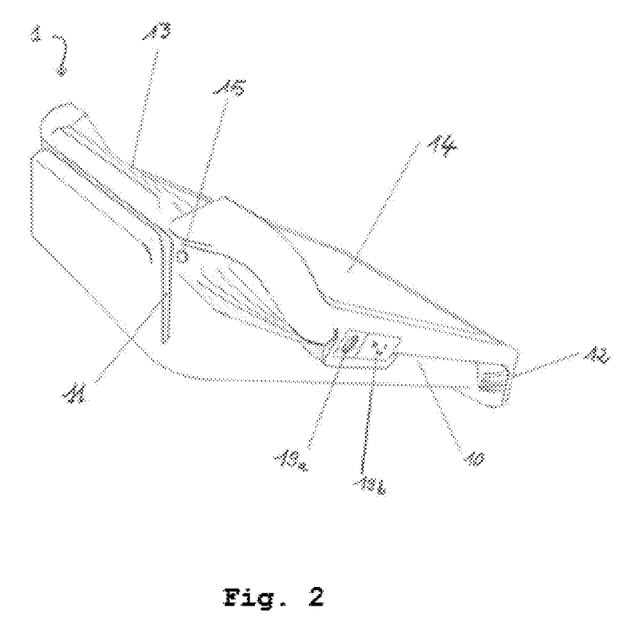
FIG. 2 is a schematic representation of a rear profile view of the payment device, according to an embodiment.

In some embodiments, the payment terminal comprises a second camera (15) located at the upper end of at least one lateral face of the housing (10) of said payment terminal (1) as illustrated in said FIG. 2. In some embodiments, the second camera may be located at the lower face of said terminal as shown in FIG. 3.

In some embodiments, the housing (10) of the payment terminal (1) also comprises at least one lateral face comprising a hole comprising at least a socket for a headphone (19a, FIG. 2) for audio guiding during the plugging-in of a headphone and an accessibility control switch (19b) for increasing at least the contrast of the display or the font size used. In some embodiments, the socket for the headphone may be used for the audio guiding of visually impaired persons. The accessibility control switch, on another side, may be used for increasing the contrast of the display for visually impaired persons.

In some embodiments, the end of said planar surface, comprising the chip card reader location (13), comprises at least a speaker (16, FIG. 1a) for guiding a user.

In some embodiments, the housing (10) of the payment terminal (1) comprises, on a lateral face opposite said at least one lateral face comprising the headphone socket, a physical security slot (18, FIG. 1a) for receiving at least a lock that prevents the removal of a component of said payment terminal (1). For example and without limitation, the physical security slot (18) is a slot of Kensington type.

In some embodiments, the terminal comprises a powering-up button located near the security slot (18).

In some embodiments, at least one lateral face of the housing (10) of said payment terminal (1) comprises at least a USB port allowing the connection of said terminal (1) to at least a computer device or a smartphone.

The connection of said payment terminal (1) to a computer device allows the configuration of said terminal (1) or the transfer at least of information and/or associated data, for example, to a payment process to said computer device or vice versa. In some embodiments, the configuration of the payment terminal (1) by the computer device comprises at least:

the management of programs implementing the functionalities of said terminal (1) and already contained in the memory of the main circuit board (1030, FIGS. 4a and 4b);

the addition of at least a set of new programs in said memory, the executions of which allow the implementation of at least a set of functionalities additional to the preceding functionalities of said payment terminal (1).

In some embodiments, the configuration of the payment terminal (1) by the computer device and/or the transfer of information between said computer device and the terminal (1) can be carried out without using a USB connection. In this case. the computer device comprises at least communicating means such as, for example, Wi-Fi or RFID or NFC for communicating with the payment terminal (1).

Figure 5:
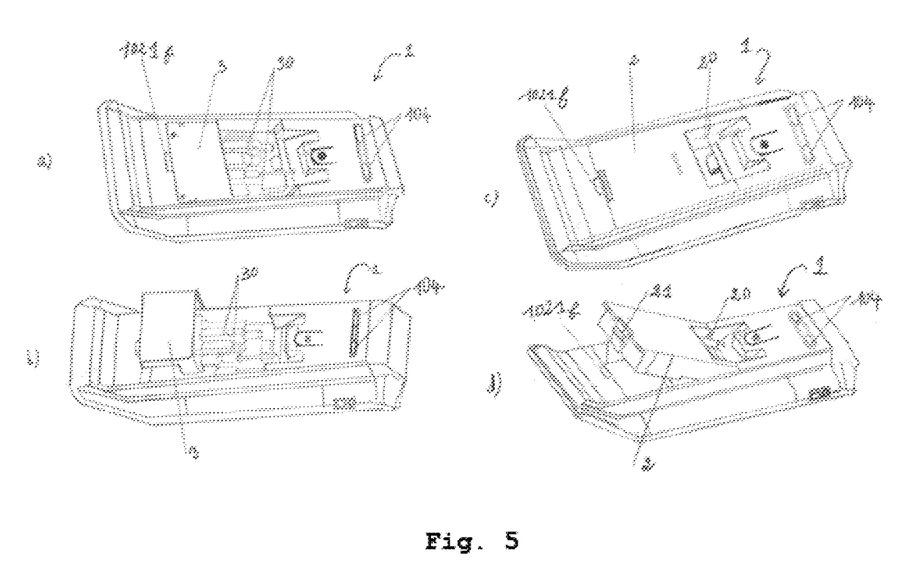
FIG. 5 is a schematic representation of the payment terminal cooperating respectively with a connector housing ((a) and (b)) according to an embodiment and with a battery housing ((c) and (d)), according to another embodiment.

In some embodiments, the payment terminal (1) can cooperate with a connector housing (3, FIGS. 4b, 5(a) and (b) for example) (ITF), said connector housing (3) being configured to be housed in the cavity (102) of the lower face of said terminal (1) and comprising at least a set of connectors (30), a power supply inlet socket, an Ethernet port, for example without limitation, a port for supplying power by Ethernet cable (PoE), a USB device and at least a USB host to allow said payment terminal (1) to communicate with at least a device configured on the "device tree", for example and without limitation, a computer or a smartphone. In some embodiments, the connector housing may comprise a serial communication port allowing the connection of the terminal to a computer device. For example and without limitation, the communication port can be an RS-232 serial communication port.

In some embodiments, the payment terminal (1) may cooperate with a battery housing (2, FIGS. 4a, 5(c) and (d) for example), said battery housing (2) being configured to be housed in the cavity (102) of the lower face of said payment terminal (1). The battery housing (2) comprises at least a battery, a power supply inlet socket and a micro USB device, and forms, with said payment terminal (1), a portable terminal (1). The payment terminal is charged by means of the power supply inlet socket.

The cavity (102) of the lower face of the payment terminal (1) may comprise at least flexible attaching means located at the level of the edge of said cavity (102) in order to retain said connector housing (3) or said battery housing (2) in the cavity (102).

In some embodiments, the lower face of the payment terminal comprises a reset button (101, FIG. 3) to allow the resetting of the configuration of the terminal (1), when said terminal is malfunctioning. In some embodiments, when said reset button (101) is enabled (activated), a reset confirmation is requested on the screen (14) of said terminal in order to avoid the configuration of the terminal being automatically reset if said reset button (101) is accidentally enabled.

In some embodiments, the housing (10) of the payment terminal (1) comprises, on at least one of its lateral faces, a location for attaching a touch-sensitive pen, said pen being used to interact with the screen of said payment terminal (1).

In some embodiments, the housing (10) of the payment terminal (1) is designed in such a way that, during a fall, no direct contact is possible between the upper lens (camera) of the screen (14) and the surface on which the terminal falls. Specifically, the upper end of the housing has a convex shape with a finite height above the planar surface containing the lens (camera), in such a way that, when it falls, the end with the convex shape prevents the planar face, and thus the lens, from being in contact with the surface on which the terminal falls. In some embodiments, the shape of the terminal, particularly at the level of the chip card reader and the magnetic stripe card or magnetic card reader on the top and at the level of the contactless card reader surface on the bottom enables to absorb shocks when said terminal falls on the ground.

In some embodiments, the payment terminal comprises attaching means for cooperating with an attachment plate (5) orienting the planar upper face of the terminal (1) in such a way that the orientation of the chip card reader (130) is such that said card forms an angle $\theta_1$:
- between 30 and 50° with respect to the horizontal, preferably 45°, if said terminal (1) is disposed on the attachment plate (5) placed on the surface of a counter;
- between 30 and 50°, preferably 45°, with respect to the vertical, if said terminal (1) is disposed on the attachment plate (5) mounted against a wall.

Figures 6A, 6B:
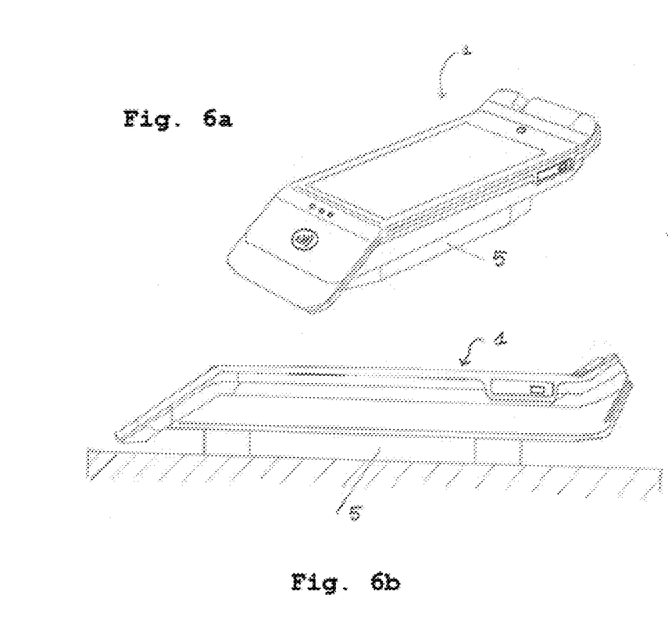
FIGS. 6a and 6b and 6c are schematic representations of the payment terminal cooperating with an attachment plate according to an embodiment.
Figure 6C:
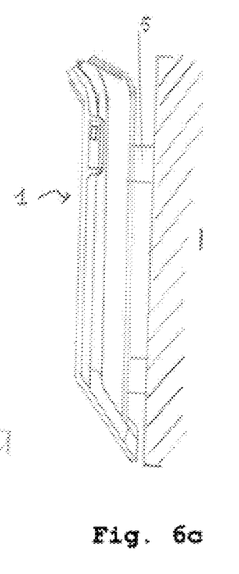

In some embodiments, the payment terminal comprises attaching means for cooperating with an attachment plate (5, see for example FIGS. 6a, 6b and 6c) orienting said terminal in such a way that, when said attachment plate is mounted against a wall, the chip card reader can be oriented upward or downward.

Figure 7A:
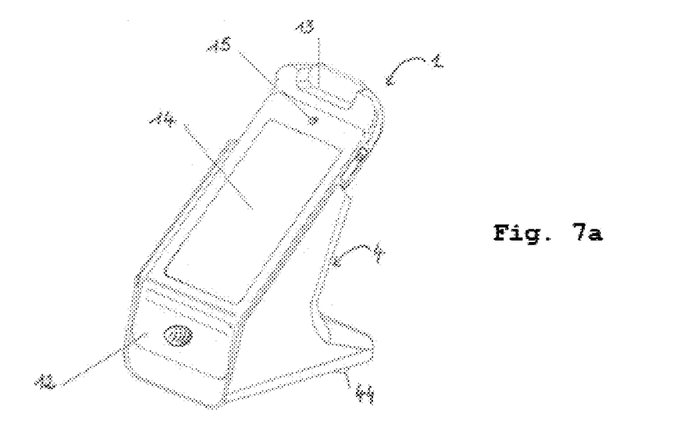
FIGS. 7a and 7b are schematic representations of a support cooperating with a payment terminal, with, respectively, the chip card reader located at the top of said support according to an embodiment and the chip card reader located at the bottom of said support according to another embodiment.
Figure 7B:
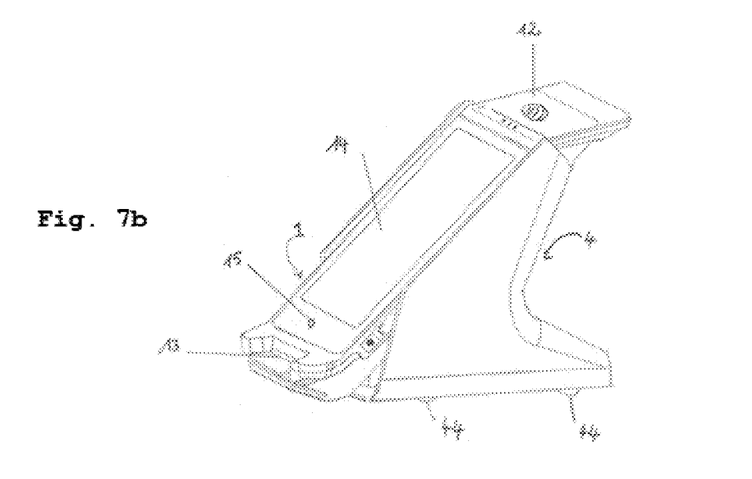

In some embodiments, the payment terminal can also be attached to a support in such a way that the chip card reader can be oriented upward or downward (see FIGS. 7a and 7b).

In some embodiments, the payment terminal (1) is adapted or configured, by means of a stored algorithm, for recording information concerning at least one product that a customer usually purchases, said information being stored in a secure database with which said terminal (1) communicates using its communicating means, for example and without limitation, WiFi or Ethernet. In some embodiments, when a product purchased by a customer is nearly out of stock, said terminal (1) is adapted or configured, by means of a stored algorithm, for displaying information stored in the secure database and associated with said product, said information comprising at least the probable date of stock-out, the date of the next provision of said product, or can also suggest another product similar to the product that said customer wishes to purchase. In some embodiments, the terminal (1) is adapted or configured, by means of a stored algorithm, for connecting to the secure database or to the Internet, by secure access, and searching for information concerning said products and their availability on markets or in the shopping centers in the neighborhood. Said items of information are thus displayed on the screen (14) of said terminal (1) and suggested to the customer.

In some embodiments, when the payment terminal (1) is in standby mode, i.e. when nobody is using it, said terminal device (1) is adapted or configured, by means of a stored algorithm, for displaying an advertisement for a shopping center, a cinema, a sports center or any other entertainment center.

In some embodiments, the accessibility control switch (19b) of the payment terminal may enable to remove the advertisements displayed on the screen (14) of the payment terminal (1).

Those skilled in the art will understand that the present application preferably relates to a system comprising the following objects:
- battery housing (2)
- connector housing (3)
- program of a "device tree" and/or software for authorization/authentication of the devices above.

In addition the invention may of course be extended to each of these objects individually.

The present application describes various technical features and advantages with reference to the figures and/or to various embodiments. Those skilled in the art will understand that the technical features of a given embodiment can in fact be combined with features of another embodiment unless the reverse is explicitly stated or unless it is obvious that these features are incompatible or that the combination does not supply a solution to at least one of the technical problems stated in the present application. In addition, the technical features described in a given embodiment can be isolated from the other features of this embodiment unless the reverse is explicitly stated.

It must be obvious to persons skilled in the art that the present invention allows embodiments in many other specific forms without departing from the field of application of the invention as claimed. Consequently, the present embodiments must be considered by way of illustration but can be modified within the field defined by the applied-for protection, and the invention must not be limited to the details given above.

The invention claimed is:
1. A payment terminal comprising:
a housing comprising a planar upper face with a protruding extension at a first end forming an angle $\theta_2$ between 30 and 50° with the planar upper face, wherein the extension further comprises a contactless reading device comprising a wired antenna configured to contactless read a contactless device and communicate contactless payment;

a magnetic stripe card reader located at a second end opposite the first end of the planar upper face and configured to read a first contact card and communicate contact payment;

a slot, located at the second end above the magnetic stripe card reader and forming an angle $\theta_1$ between 30 and 50° with the planar upper face, the slot being parallel to the protruding extension and comprising a contact chip card reader configured to read a second contact card and communicate contact payment; and a main circuit board comprising at least:
  a controller,
  a memory configured to store data and programs, wherein the controller comprises at least a processor configured to execute said programs when the processor receives instructions from the memory in order to control at least a display device displaying a virtual keyboard,
  a communication device configured to communicate by Internet or by WiFi, and
  a functionality of contact and contactless card reading and payment,
wherein the main circuit board further comprises:
  near the second end, a connector configured to connect to the contact chip card reader and oriented with the angle $\theta_1$ between 30 and 50° with a planar surface of the main circuit board, and
  near the first end, a flexible connector configured to connect to the wired antenna of the contactless reading device and oriented with the angle $\theta_2$ between 30 and 50° with the planar surface of the main circuit board, and
  the housing comprises a lower face opposite the planar upper face and including at least bearing areas in such a way that, when the lower face is disposed on a surface of a counter or a desk, the protruding extension of the planar upper face forms the angle $\theta_2$ between 30 and 50° with the surface of the counter or the desk.

2. The payment terminal according to claim 1, wherein the memory of said main circuit board also comprises at least a program, the execution of which implements a "device tree" functionality, said functionality allowing the association of at least a set of devices with said payment terminal, said devices being controlled by the processor of said main circuit board.

3. The payment terminal according to claim 1, wherein the lower face of the housing further comprises
  a cavity comprising at least:
    a set of sockets configured to plug said payment terminal into a charging device or an electrical socket by a socket connector;
    an Ethernet socket configured to plug in at least an Ethernet cable; and
    a set of retention devices configured to attach said payment terminal to a support or to attach at least a charging device to the payment terminal.

4. The payment terminal according to claim 3, wherein the cavity of the lower face of said payment terminal comprises at least a SIM card slot for a 4G or 3G wireless connection of said payment terminal to the Internet, a micro-SD slot for recording data and at least a secure access module (SAM) slot for receiving at least a SAM card which manages the secure access to the functionality of said payment terminal.

5. The payment terminal according to claim 1, wherein the display device is an interactive touch-screen for displaying at least information such as icons or a button and comprising a virtual keyboard allowing a user to enter information or to make a selection of one or more icons to trigger a functionality or an application.

6. The payment terminal according to claim 5, wherein the interactive touch-screen comprises at least a light sensor for the automatic adaptation of the contrast of the display.

7. The payment terminal according to claim 5, wherein the interactive touch-screen comprises at least an accelerometer for the automatic orientation of the user interface in landscape mode or in portrait mode as a function of the orientation of the payment terminal.

8. The payment terminal according to claim 1, wherein the planar upper face comprises at least:
  a camera for recording events when the payment terminal is used, said events being stored in the memory of said payment terminal; and
  a light guide located below an interactive touch-screen of the payment terminal and near an edge of the protruding extension of said planar upper face for detecting the contactless card.

9. The payment terminal according to claim 8, wherein the camera is adapted for starting to record the events when a user interacts with the screen of said payment terminal, a recording functionality of the camera being automatically turned on.

10. The payment terminal according to claim 8, wherein the camera is adapted for stopping recording when no user interacts with said interactive touch-screen of said payment terminal during a predetermined time, a recording functionality being automatically turned off.

11. The payment terminal according to claim 8, wherein said camera is adapted for reading tags or QR codes comprising information concerning a product via a scanning functionality included in said camera.

12. The payment terminal according to claim 8, wherein said payment terminal comprises a second camera located at an upper end of at least one lateral face of the housing of said payment terminal or at a lower face of said payment terminal.

13. The payment terminal according to claim 8, wherein the memory of the main circuit board comprises at least a program, the execution of which enables to implement a functionality of triggering and recording of the camera.

14. The payment terminal according to claim 1, wherein the housing of the payment terminal also comprises at least one lateral face comprising a hole comprising at least a socket for a headphone for audio guiding during plugging-in of a headphone and an accessibility control switch for increasing at least contrast of the display or a font size used.

15. The payment terminal according to claim 1, wherein the second end, comprising the slot of the contact chip card reader, comprises at least a speaker for guiding a user.

16. The payment terminal according to claim 14, wherein the housing of the payment terminal comprises, on a lateral face opposite said at least one lateral face comprising the headphone socket, a physical safety slot for receiving at least a lock which prevents the removal of a component of said payment terminal.

17. The payment terminal according to claim 1, wherein at least one lateral face of the housing of said payment terminal comprises at least a USB port allowing a connection of said payment terminal to at least a computer device or a smartphone, said computer device comprising at least wireless communicating device configured to communicate with the payment terminal.

18. The payment terminal according to claim 17, wherein said payment terminal is configured by said computer device or transfers at least information or data associated with a payment process to said computer device or vice versa by the connection.

19. The payment terminal according to claim 17, wherein said payment terminal is configured by the computer device to at least:
  manage the programs implementing functionalities of said payment terminal and already contained in the memory of the main circuit board;
  add at least a set of new programs into said memory, executions of which allow the implementation of at least a set of functionalities additional to the preceding functionalities of said payment terminal.

20. The payment terminal according to claim 3, wherein the lower face of the payment terminal comprises a reset button for resetting a configuration of the payment terminal, when said payment terminal is malfunctioning, a reset confirmation being requested on an interactive touch-screen of said payment terminal, when said reset button is enabled, in order to avoid the configuration of the payment terminal being automatically reset if said reset button is accidentally enabled.

21. The payment terminal according to claim 1, wherein the housing of the payment terminal comprises, on at least one of its lateral faces, a location for attaching a touch-sensitive pen, said pen being configured to interact with an interactive touch-screen of said payment terminal.

22. The payment terminal according to claim 3, wherein the set of retention devices comprises at least a retention device to attach an attachment plate orienting the planar upper face of the payment terminal in a way that an orientation of the slot and the second contact card when inserted into the contact chip card reader forms the angle $\theta_1$:
  between 30 and 50° with respect to a horizontal orientation, when said payment terminal is disposed on the attachment plate placed on a surface of a counter;
  between 30 and 50° with respect to a vertical orientation, when said payment terminal is disposed on the attachment plate mounted against a wall.

23. The payment terminal according to claim 1, wherein said payment terminal is adapted for recording information concerning at least one product that a customer purchases, said information being stored in a secure database with which said payment terminal communicates using a communication device.

24. The payment terminal according to claim 1, wherein said payment terminal is adapted for displaying information stored in a secure database and associated with a product that is purchased by a customer and is nearly out of stock.

25. The payment terminal according to claim 1, wherein said payment terminal is adapted for connecting to a secure database or to the Internet, by a secure access, and searching for information concerning products and their availability on markets or in shopping centers in the neighborhood, said information being displayed on an interactive touch-screen of said payment terminal and suggested to the customer.

26. The payment terminal according to claim 1, wherein said payment terminal is adapted for displaying advertisements for a shopping center, to a cinema, a sports center or any other entertainment center when it is in standby mode.

27. The payment terminal according to claim 14, wherein the accessibility control switch of the payment terminal is configured to remove advertisements displayed on an interactive touch-screen of said payment terminal.

28. The payment terminal according to claim 1, wherein the contactless payment device comprises at least a chip card or other devices comprising a smartphone or other mobile devices.

29. A payment system comprising a connector housing cooperating with the payment terminal according to claim 2, said connector housing being configured to be housed in a cavity of a lower face of said payment terminal and comprising at least an electrical power inlet socket, an Ethernet port, a USB port and at least a USB host to allow said payment terminal to communicate with at least a device configured on the "device tree".

30. A portable payment terminal comprising a battery housing cooperating with said payment terminal according to claim 3, said housing being configured to be housed in the cavity of the lower face of said payment terminal and comprising at least a battery, a power supply inlet socket and a micro USB device.

* * * * *